US007537092B2

(12) United States Patent
Birrer et al.

(10) Patent No.: US 7,537,092 B2
(45) Date of Patent: May 26, 2009

(54) ELEVATOR INSTALLATION AND METHOD FOR DETECTING A CAR POSITION

(75) Inventors: Eric Birrer, Luzem (CH); Enrico Marchesi, Kilchberg (CH); Frank Müller, Dortmund (DE)

(73) Assignee: Inventio AG, Hergiswil NW (CH)

( * ) Notice: Subject to any disclaimer, the term of this patent is extended or adjusted under 35 U.S.C. 154(b) by 727 days.

(21) Appl. No.: 11/197,423

(22) Filed: Aug. 4, 2005

(65) Prior Publication Data

US 2006/0118364 A1 Jun. 8, 2006

(30) Foreign Application Priority Data

Aug. 12, 2004 (EP) ................................. 04405507

(51) Int. Cl.
*B66B 3/02* (2006.01)
*G01B 7/00* (2006.01)

(52) U.S. Cl. ........................................ 187/391; 33/706

(58) Field of Classification Search ................. 187/391, 187/394; 33/706, 708
See application file for complete search history.

(56) References Cited

U.S. PATENT DOCUMENTS

| | | | | |
|---|---|---|---|---|
| 4,433,756 | A | 2/1984 | Caputo et al. | |
| 4,750,592 | A * | 6/1988 | Watt | 187/394 |
| 4,798,267 | A * | 1/1989 | Foster et al. | 187/389 |
| 5,135,081 | A | 8/1992 | Watt et al. | |
| 5,798,490 | A | 8/1998 | Vairio et al. | |
| 5,925,859 | A * | 7/1999 | Miller et al. | 187/394 |
| 6,874,244 | B2 * | 4/2005 | Birrer et al. | 187/294 |
| 2002/0104716 | A1 | 8/2002 | Zaharia | |
| 2003/0070883 | A1 * | 4/2003 | Foster et al. | 187/394 |
| 2006/0032711 | A1 * | 2/2006 | Marchesi | 187/394 |
| 2007/0227831 | A1 * | 10/2007 | Zaharia | 187/394 |
| 2008/0087502 | A1 * | 4/2008 | Zapf | 187/394 |

FOREIGN PATENT DOCUMENTS

| | | |
|---|---|---|
| AU | 200215680 | 8/2002 |
| BR | 9303533 | 5/1995 |
| DE | 92 10 996.9 | 12/1992 |
| DE | 44 01 977 | 7/1995 |
| DE | 44 04 779 | 8/1995 |
| EP | 0 192 513 | 1/1989 |
| FR | 2 579 189 | 9/1986 |
| JP | 07157220 | 6/1995 |
| WO | 2002/096788 | 12/2002 |
| WO | 2003/011732 | 2/2003 |
| WO | WO03/011733 | 2/2003 |

* cited by examiner

*Primary Examiner*—Walter Benson
*Assistant Examiner*—Eduardo Colon-Santana
(74) *Attorney, Agent, or Firm*—Fraser Clemens Martin & Miller LLC; William J. Clemens

(57) ABSTRACT

An elevator installation, and a method of operating such an elevator installation, has at least one car and at least one equipment for detecting a car position wherein the equipment includes a code mark pattern and a sensor device. The code mark pattern is mounted along the travel path of the car and has a plurality of code marks arranged in a single track. The sensor device is mounted at the car and contactlessly scans the code marks with a plurality of sensors arranged in a single track.

9 Claims, 6 Drawing Sheets

ELEVATOR INSTALLATION AND METHOD FOR DETECTING A CAR POSITION

BACKGROUND OF THE INVENTION

The present invention relates to an elevator installation with a car and equipment for detecting a car position, as well as to a method of operating such an elevator installation.

It is known to determine the car position of an elevator installation in order to derive from this information control signals which are further used by the elevator control. Thus, German Utility Model DE 9210996 U1 teaches equipment for determining the car position by a magnet strip and a magnet head for reading the magnet strip. The magnet strip has a magnetic coding and extends along the entire travel path of the car. The magnet head fastened to the car contactlessly reads the coding. A car position is determined from the read-off codes.

A further development of this known equipment is disclosed in Patent Specification WO 03011733 A1. According to the teaching of this patent specification the coding of the magnet strip consists of a plurality of code marks arranged in a row. The code marks are magnetized either as a south pole or as a north pole. Several successive code marks form a code word. The code words are in turn arranged in a row as a code mark pattern with binary pseudo random coding. Each code word thus represents an absolute car position.

For scanning the magnetic fields of the code marks the equipment of the Patent Specification WO 03011733 A1 comprises a sensor device with several sensors, which enable simultaneous scanning of several code marks. The sensors convert the different poling of the magnetic fields into corresponding binary information. For south poles it issues a binary value "0" and for north poles a bit value "1". This binary information is evaluated by an evaluating unit of the equipment and processed into an absolute position statement comprehensible to the elevator control and used by the elevator control as control signals.

Patent Specification WO 03011733 A1 further teaches the use of small sensors of three millimeter length, which are arranged in two mutually adjacent tracks so that two sensors come to lie on the length of a code mark. Due to this periodicity of the sensors which is twice as high as that of the code marks the sensors can clearly detect a transition between differently poled code marks as a zero transition of the magnetic field.

In the detection of the magnetic field of the code marks the resolution of the absolute car position is equal to the length of one code mark, i.e. four millimeters. In detection of the transition between differently poled code marks the resolution of the absolute car position is substantially better and amounts to 0.5 millimeters.

A disadvantage of the equipment of the Patent Specification WO 03011733 A1 is firstly that the strength of the magnetic field in normal direction above the code marks rapidly decreases and the sensors therefore have to be positioned at a small spacing of three millimeters above the code marks. A further disadvantage of this equipment is that the sensors have to be positioned centered above the code marks with a high degree of accuracy of +/− one millimeter. The sensor device above the code pattern has to be guided in a complicated manner for a sufficiently large security and adequate reliability of the elevator installation. This is costly. The cost connected therewith is very large particularly in the case of high car speeds of ten m/sec.

SUMMARY OF THE INVENTION

The present invention has an object of indicating an elevator installation with a car and equipment for determining the car position as well as a method of operating such an elevator installation, which enables accurate scanning of a code mark pattern by a sensor device at low cost without security and reliability being impaired.

This object is fulfilled by the present invention. The elevator installation comprises at least one car and at least one item of equipment for determining a car position. The equipment comprises a code mark pattern and a sensor device. The code mark pattern is mounted along the travel path of the car and consists of a plurality of code marks. The sensor device is mounted at the car and contactlessly scans the code marks by sensors. The code marks are arranged in a single track and the sensors are arranged in a single track.

An advantage of the present invention is that the dimensions of the code marks and of the track of the sensors are optimally matched to the signal strength of the code marks. Through use of a single track for the code marks and a single track for the sensors an efficient and loss-free scanning of the code marks is carried out by the sensors. The arrangement of the sensors in a single track centrally above the track of code marks allows a selective scanning of the code marks in the region of high signal strength. In this connection there is consideration that a given signal strength of the code marks on the one hand decreases towards the edges of the code marks and that on the other hand it decreases from a certain spacing above the code marks. The high signal strengths, which are scanned efficiently and free of loss in that manner, of the code marks lead to large confidence regions in which the sensors can securely and reliably scan the code marks with sufficiently powerful sensor signals. It is therefore possible to design the confidence region in a selective manner and thus arrange the sensors not at a spacing above the code marks limited by the signal strength, but at a spacing above the code marks determined by the effort in guidance. Through increase in the spacing of the sensors above the code marks the expense for guidance of the sensor device is reduced and yet a high security and reliability of the elevator installation is guaranteed.

Advantageously, for a given signal strength of the code marks and given sensitivity of the sensors the mark dimension of the code marks and/or the track dimension of the track of the sensors is or are so selected that the sensors are positionable at maximum spacing above the code marks.

Advantageously the mark dimension is less than 2.5 millimeters and/or the track dimension is less than 2.5 millimeters.

Advantageously the sensors are guided above the code marks at a minimum spacing in a range of preferably 15 millimeters to 4 millimeters.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
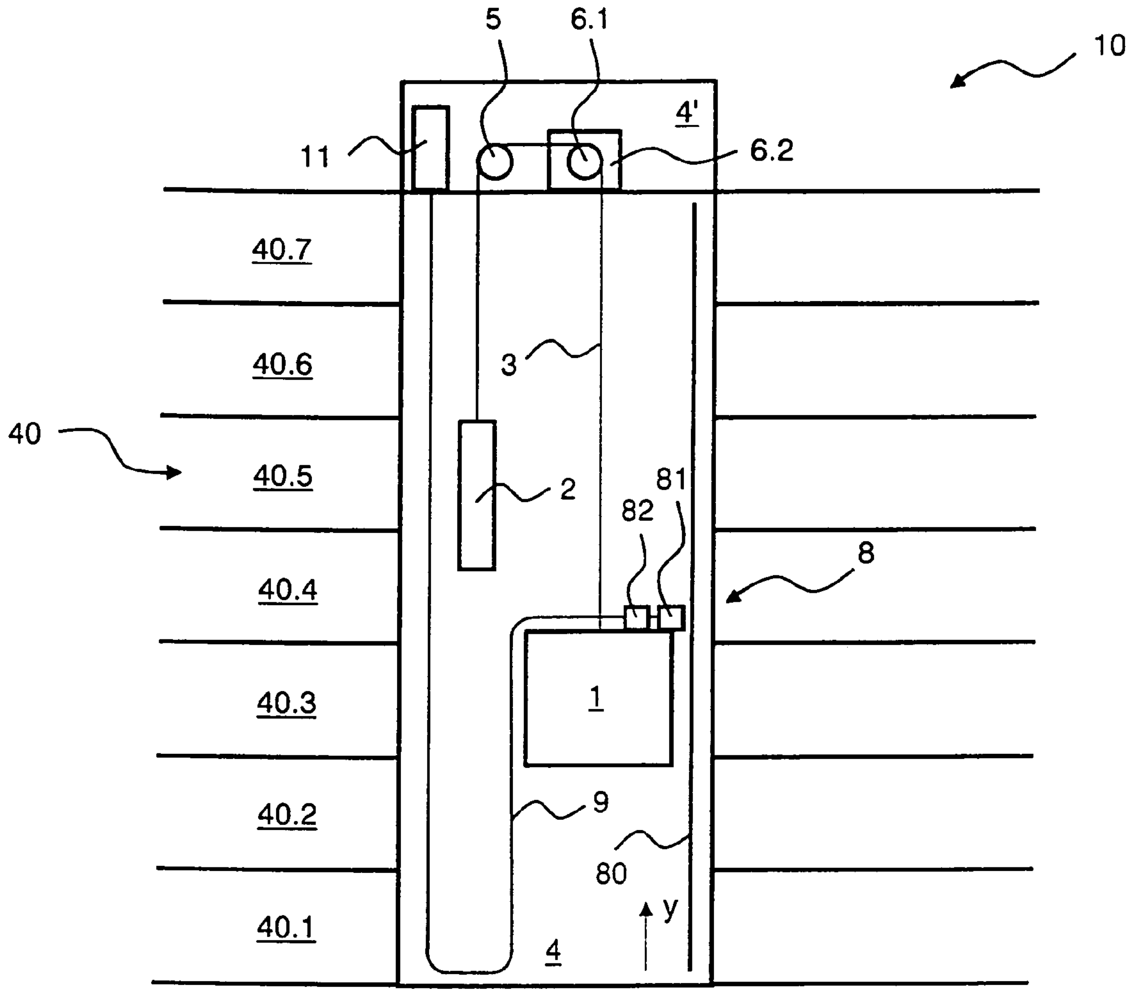
FIG. 1 is a schematic elevation view of an elevator installation with a car and equipment for determining the car position in accordance with the present invention.

With respect to the elevator installation: An elevator installation 10 is schematically illustrated in FIG. 1 and includes a car 1 and a counterweight 2 suspended at at least one support cable 3 in a shaft 4 in a building 40. The support cable 3 runs over a deflecting roller 5 and is driven by way of a drive pulley 6.1 by a drive 6.2. The deflecting roller 5, the drive pulley 6.1 and the drive 6.2 can be arranged in a separate engine room 4', but they can also be disposed directly in the shaft 4. Through left-hand or right-hand rotation of the drive pulley 6 the car 1 is moved along a travel path in or opposite to a travel direction y and serves floors 40.1 to 40.7 of the building 40.

With respect to determining the car position: Equipment 8 for determining the car position comprises a code mark pattern 80 with code marks, a sensor device 81 and an evaluating unit 82. The code mark pattern 80 has a numerical coding of absolute positions of the car 1 in the shaft 4 referred to a reference point. The code mark pattern 80 is applied in a stationary position in the shaft 4 along the entire travel path of the car 1. The code mark pattern 8 can be mounted freely stretched in the shaft 4, but it can also be fastened to shaft walls or guide rails of the elevator installation 10. The sensor device 81 and the evaluating unit 82 are mounted on the car 1. The sensor device 81 is thus moved together with the car 1 and in that case contactlessly scans the code marks of the code mark pattern 80. For this purpose the sensor device 81 is guided at a small spacing from the code mark pattern 80. Accordingly, the sensor device 81 is fastened at the car 1 perpendicularly to the travel path by way of a mount. According to FIG. 1 the sensor device 81 is fastened on the car roof, but it is obviously entirely possible to fasten the sensor device 81 to the car 1 at the side or at the bottom. The sensor device 81 passes on the scanned information to the evaluating unit 82. The evaluating unit 82 translates the scanned information into an absolute position statement comprehensible to an elevator control 11. This absolute position statement is passed on to the elevator control by way of a hanging cable 9. The elevator control 11 uses this absolute position statement for manifold purposes. For example, it serves for control of the plot of the travel of the car 1, such as insertion of retardation and acceleration measures. In addition, it serves for shaft end retardation, shaft end limitation, floor recognition, exact positioning of the car 1 at the floors 40.1 to 40.7 and obviously also speed measurement of the car 1.

With knowledge of the present invention the expert can obviously realize other elevator installations with other forms of drive, such as hydraulic drive, etc., or elevators without a counterweight, as well as wire-free transmission of position statements to an elevator control.

Figure 2:
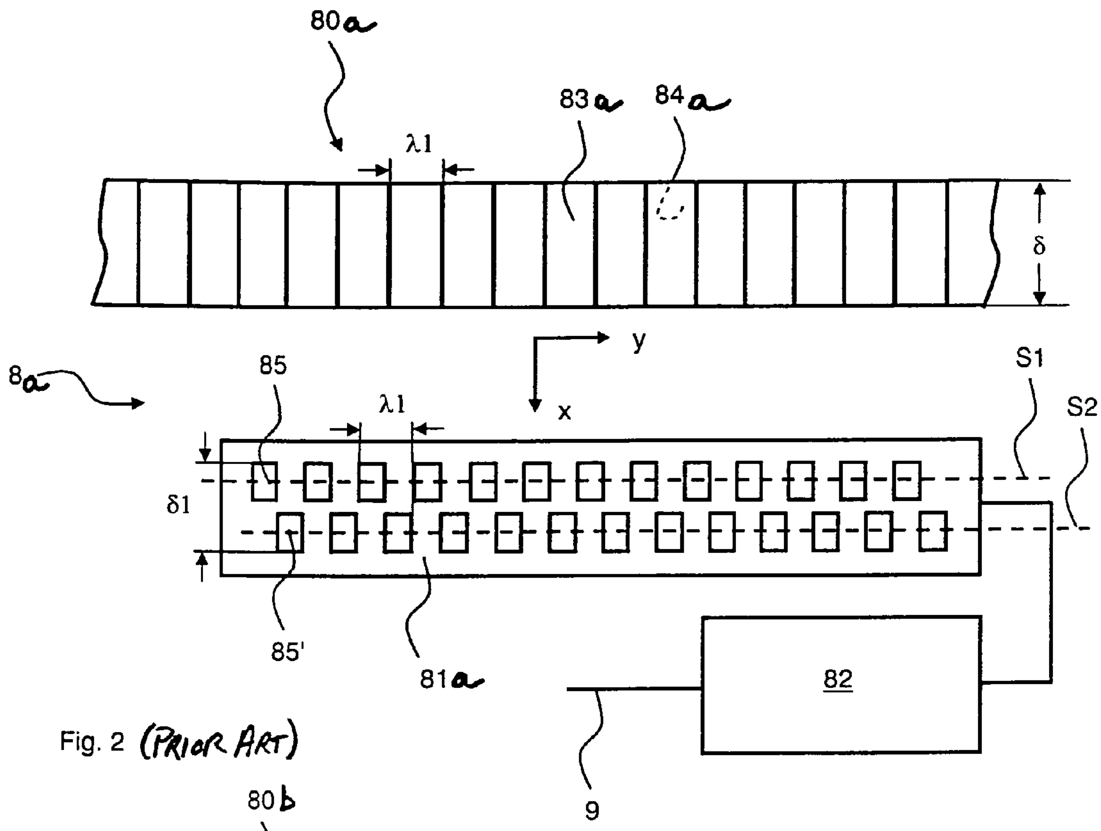
Fig. 2 (PRIOR ART)
FIG. 2 is a schematic view of a portion of the equipment for determining the car position, with a sensor device and a code mark pattern from the Patent Specification WO 03011733 A1.
Figure 3:
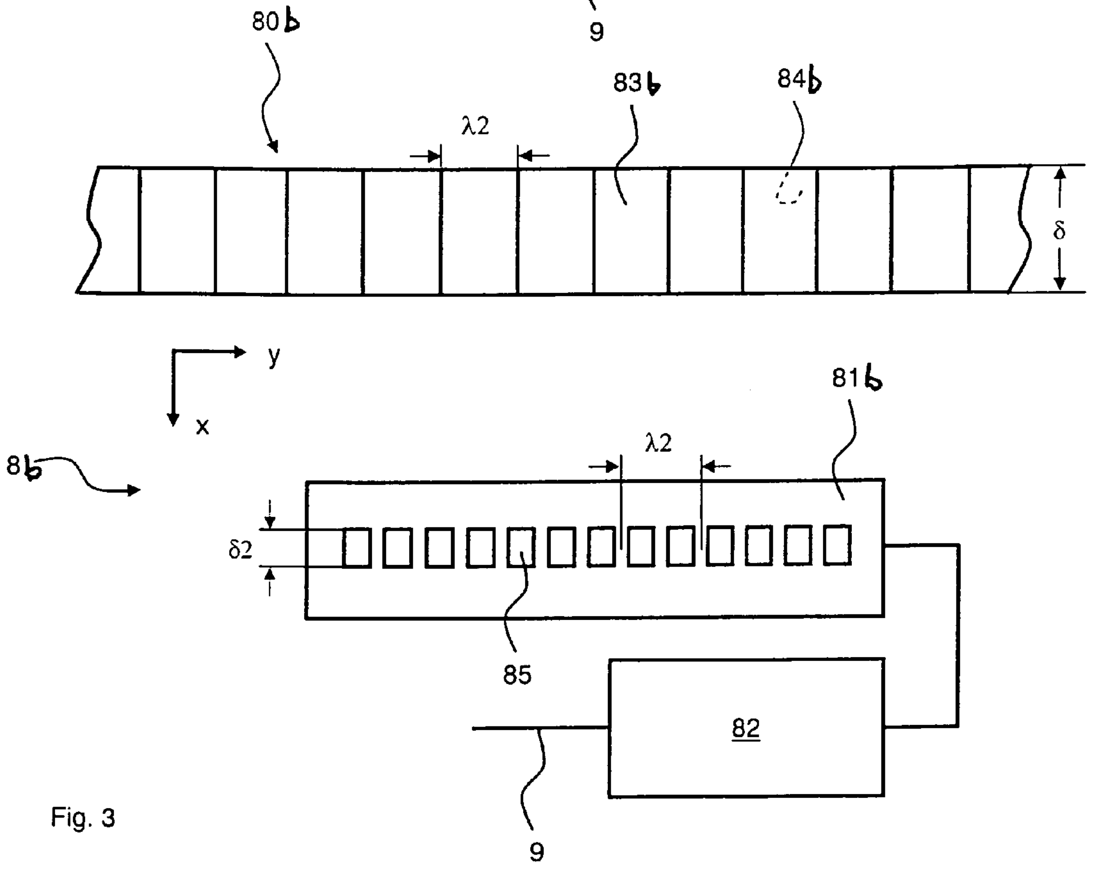
FIG. 3 is a schematic view of a portion of a first form embodiment of equipment according to the present invention for determining the car position with a sensor device and a code mark pattern.
Figure 4:
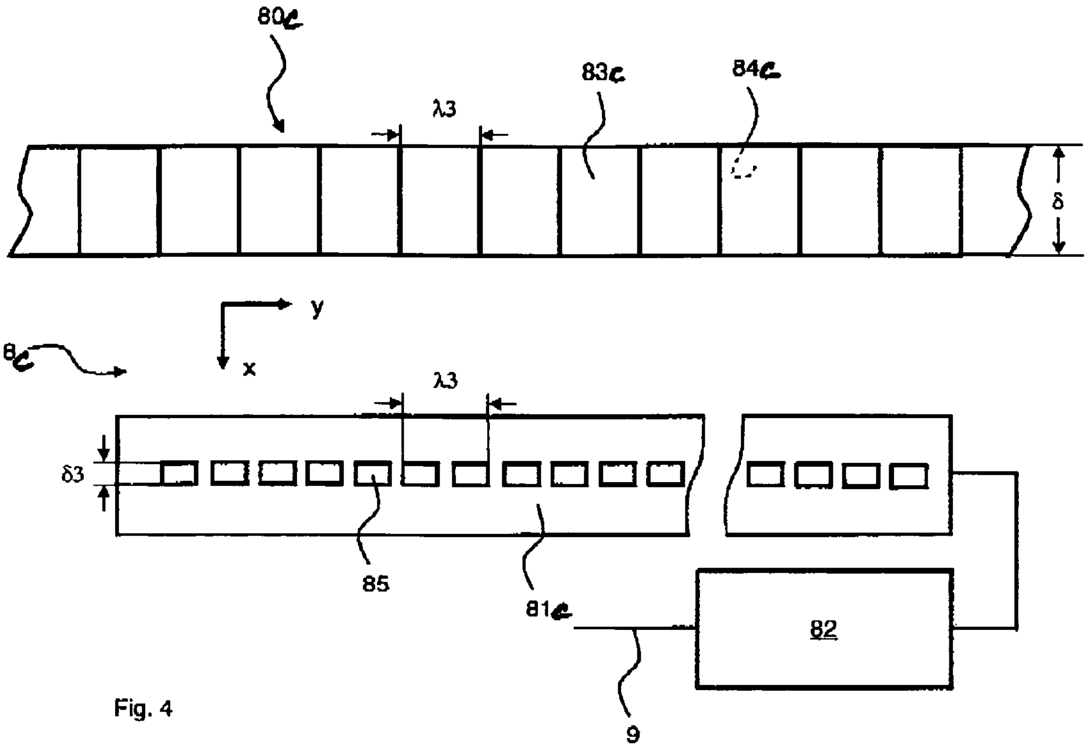
FIG. 4 is a schematic view of a portion of a second embodiment of equipment according to the present invention for determining the car position, with a sensor device and a code mark pattern.

FIGS. 2 to 4 show the construction of the parts of the equipment 8 for determination of the car position, with the evaluating unit 82, the sensor device 81 and the code mark pattern 80. Reference numerals for similar parts are identified with "a" in FIGS. 2, 5 and 8, with "b" in FIGS. 3, 6 and 9, and with "c" in FIGS. 4, 7 and 10. Whereas FIG. 2 shows equipment 8*a* for the determination of the car position from the Patent Specification WO 03011733 A1, FIGS. 3 and 4 show a first embodiment 8*b* and a second embodiment 8*c* respectively according to the present invention for the determination of the car position.

With respect to code mark pattern: The code mark pattern 80 (80*a*, 80*b*, 80*c*) consists of a plurality of code marks 83*a*, 83*b*, 83*c* applied to a carrier 84*a*, 84*b*, 84*c*. The code marks 83*b*, 83*c* which are used in the illustrated form of embodiment of the equipment 8*b*, 8*c* for determination of the car position, are, from the aspect of materials, all identical.

Advantageously, the code marks 83*b*, 83*c* have high coercive field strengths. The carrier 84*b*, 84*c* is, for example, a plastics material strip of one millimeter carrier thickness and ten millimeter carrier width. The code marks 83*b*, 83*c* consist, for example, of magnetizable material similarly of one millimeter mark thickness and a mark width $\delta$=10 millimeters. The code marks 83*b*, 83*c* are arranged on the carrier 84*b*, 84*c* as seen in the longitudinal direction y and form rectangular sections of equal length. The longitudinal direction y corresponds with the travel direction y according to FIG. 1. The code marks 83*b*, 83*c* are equidistantly spaced. They are magnetized either as a south pole or a north pole. Advantageously the marks 83*b*, 83*c* are magnetized to the point of saturation. For iron used as magnetic material of the code marks, saturation magnetization amounts to 2.4 T. The code marks have a given signal strength, for example they are produced with a specific magnetization of +/−10 mT. A south pole forms a negative magnetic field and a north pole forms a positively oriented magnetic field. With knowledge of the present invention differently dimensioned code mark patterns with wider or narrower mark widths, as well as thicker or thinner mark thicknesses, can obviously also be used. In addition, apart from iron as the magnetic material for the code marks also any other industrially proven and economic magnetic materials, for example rare earths such as neodymium, samarium, etc., or magnetic alloys or oxide materials or polymer-bonded magnets, etc., can be used.

With respect to mark dimension: The differences of the code mark pattern 80 in the forms of embodiment of the equipment 8 for determination of the car position are that in the prior art equipment 8*a* according to FIG. 2 the mark length $\lambda 1$=4 millimeters, whilst in the equipment 8*b* in accordance with FIG. 3 the mark length $\lambda 2$=6 millimeters and in the second embodiment 8*c* in accordance with FIG. 4 the mark length $\lambda 3$=7 millimeters. The code marks 83*b* and 83*c* according to the present invention are thus longer than the code marks 83*a* from the state of the art. The mark dimension MD1, MD2, MD3 of the code marks is determined from the width-to-length ratio of the code marks. In FIG. 2, the mark dimension MD1=10/4=2.5, whilst according to the first embodiment of FIG. 3 the mark dimension MD2=10/6=1.7 or according to the second embodiment of FIG. 4 the mark dimension MD3=10/7=1.4. The mark dimension MD according to the present invention is thus MD2, MD3<2.5. With knowledge of the present invention obviously also differently dimensioned code mark patterns with smaller mark dimensions MD equal to or smaller than 1.2 or MD equal to or smaller than 1.0 can be used.

With respect to the sensor device: The sensor device 81 scans the magnetic fields of the code marks 83 as seen in the longitudinal direction y. In FIG. 2, the scanning is by a plurality of equidistantly spaced sensors 85, 85'. The sensors 85, 85' used in the three embodiments of the equipment 8*a*, 8*b*, 8*c* for determination of the car position are identical from the aspects of mechanical dimensions and sensitivity. Preferably, economic and easily controllable and readable Hall sensors are used for the sensors 85, 85'. The sensors 85, 85' form rectangular sections of equal length with a wide side of three millimeters and a narrow side of two millimeters. For example, the sensors 85, 85' are supported sensors in which a carrier bounds the wide side and the narrow side and the actual sensor area 850, 850' has a significantly smaller dimension of, for example, one square millimeter. In the case of Hall sensors the sensor area 850, 850' is typically arranged centrally in the interior of the sensors. The sensors 85, 85' detect by way of the sensor area 850, 850' the magnetic fields of the code marks 83*a*, 83*b*, 83*c* as sensor signals. The stronger the signal strength of the code marks 83*a*, 83*b*, 83*c*, the more powerful is the sensor signal of the sensors 85, 85'. Typical sensitivities of Hall sensors amount to 150 V/t. The sensors 85, 85' issue binary data for the magnetic fields, which are detected as analog voltages, of the code marks 83*a*, 83*b*, 83*c*. For a south pole they issue a bit value "0" and for a north pole they issue a bit value "1". With knowledge of the present invention the expert can, however, also use other magnetic sensors, such as coils. In addition, the expert can use differently dimensioned sensors with wider or narrower wide sides, as well as wider or narrower narrow sides. Moreover, the expert can use more sensitive or less sensitive Hall sensors.

With respect to coding: The code mark pattern 80*a*, 80*b*, 80*c* has a binary pseudo random coding. The binary pseudo random coding is thus a sequence, arranged gaplessly one after the other, with n bit values "0" or "1". In each movement along by one bit value in the binary pseudo random coding a new n-digit sequence with bit values "0" or "1" arises. Such a sequence of "n" bit values disposed in succession is termed code word. For example, a code word with a 13-digit sequence is used. On simultaneous scanning of, in each instance, thirteen successive code marks 83*a*, 83*b*, 83*c* of the code mark pattern 80*a*, 80*b*, 80*c*, the 13-digit sequence is read out clearly and without repetition of code words. The sensor device 81*a*, 81*b*, 81*c* for reading the code words comprises thirteen plus one, i.e. fourteen, sensors 85, 85'. With knowledge of the present invention the expert can obviously realize sensor devices with code words of greater or lesser length and correspondingly a greater or lesser number of sensors. In addition, it is possible to realize a so-called Manchester coding in which after each south pole code mark an inverse north pole code mark is added and conversely. Consequently, a zero transition of the magnetic field takes place in the code mark pattern at the latest after two code marks, which enables synchronization of the sensors. The code words are then twice as long and also twice as many sensors are needed for scanning the code words. The expert can use any known and industrially proven unambiguous, repetitive absolute coding.

With respect to resolution: In order to achieve a high resolution of 0.5 millimeters of the absolute car position, transitions between differently poled code marks 83*a*, 83*b*, 83*c* are measured as zero transitions of the magnetic field. For this purpose, the periodicity of the sensors 85, 85' is twice as high as that of the code marks 83*a*, i.e. two sensors 85, 85' come into play per mark length λ1, λ2, λ3. In this manner each mark 83*a*, 83*b*, 83*c* of the code mark pattern 80*a*, 80*b*, 80*c* is detected by two sensors 85, 85'. If one of the two sensors 85, 85' is disposed in the vicinity of a code mark change and supplies a sensor signal approximately of the value zero, then the respective other sensor 85, 85' is with certainty disposed in coincidence with a code mark 83*a*, 83*b*, 83*c* and supplies secure information. This embodiment of the equipment for determining the car position with two sensors per code mark is practicable for attainment of a high resolution, but is not obligatory for realization of the present invention.

With respect to track dimension: The differences of the sensor device 81*a*, 81*b*, 81*c* in the three forms of the equipment 8*a*, 8*b*, 8*c* for determining the car position are that in the prior art equipment 8*a* according to FIG. 2 the sensors 85, 85' are arranged, as seen in longitudinal direction y, in two tracks S1 and S2 with the overall track width δ1=7 millimeters. In contrast, the sensors 85 of the first embodiment according to the present invention shown in FIG. 3 are arranged, as seen in the longitudinal direction y, in a single track with the track width δ2=3 millimeters and the sensors 85 of the second embodiment according to the present invention shown in FIG. 4 are arranged, as seen in the longitudinal direction y, in a single track with the track width δ3=2 millimeters. In the prior art embodiment according to FIG. 2, the first track S1 of the sensors 85 is formed by the wide side of the sensors 85, the second track S2 of sensors 85' is formed by the wide side of the sensors 85', and the two tracks S1, S2 of the sensors 85, 85' are spaced apart, as seen in the transverse direction x, by one millimeter. In the first embodiment according to the present invention shown in FIG. 3, the track width δ2=3 millimeters is formed solely by the wide side of the sensors 85. In the second embodiment according to the present invention shown in FIG. 4, the track width δ3=2 millimeters is formed solely by the narrow side of the sensors 85. Thus, the track width according to the present invention is narrower than the two tracks S1, S2 of the prior art sensor device 81*a*. The track dimension SD1, SD2, SD3 of the sensors 85, 85' is determined from the ratio of the track width δ to the length of a sensor 85, 85'. In the prior art according to FIG. 2, the track dimension SD1=7/2, whilst the present invention according to FIG. 3 has a track dimension SD2=3/2 or according to FIG. 4 has a track dimension SD3=2/3. The track dimension SD according to the present invention is thus SD2, SD3<2.5. With knowledge of the present invention obviously also differently dimensioned sensor devices with even smaller track dimensions SD equal to or smaller than ⅔ or with a track dimension SD=1 or with greater track dimensions SD equal to or greater than 2/3 can be used.

Figure 5:
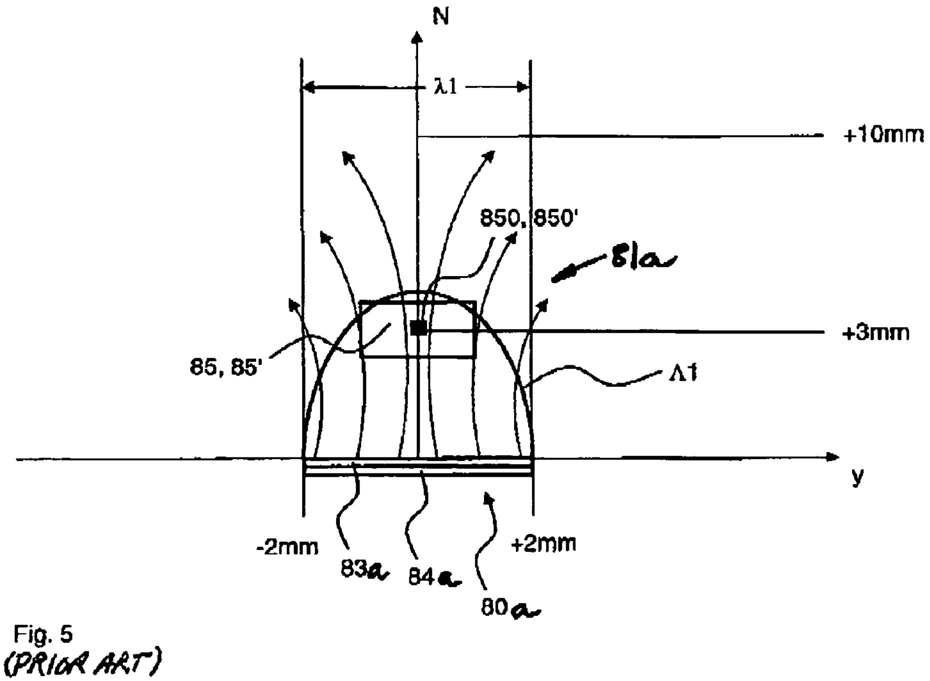
Fig. 5 (PRIOR ART)
FIG. 5 is a longitudinal view of the sensor device above a code mark of the prior art equipment for determining the car position shown in FIG. 2.
Figure 6:
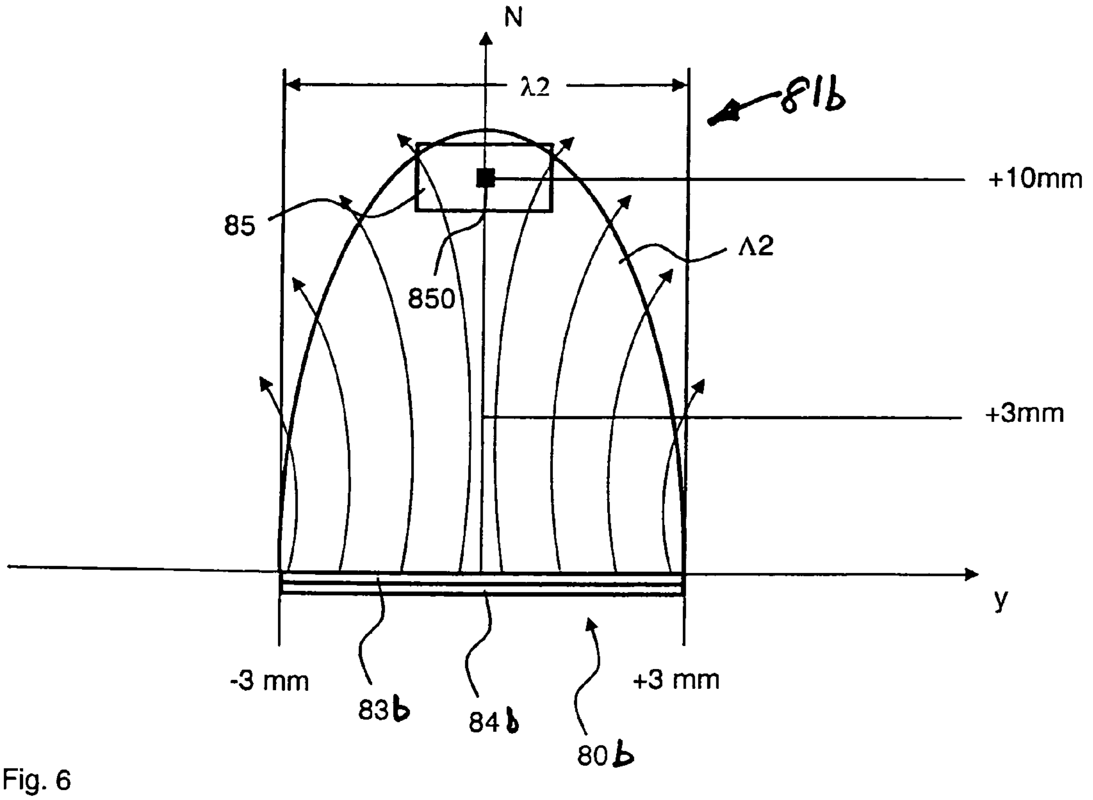
FIG. 6 is a longitudinal view of the sensor device above a code mark of the first embodiment equipment shown in FIG. 3.
Figure 7:
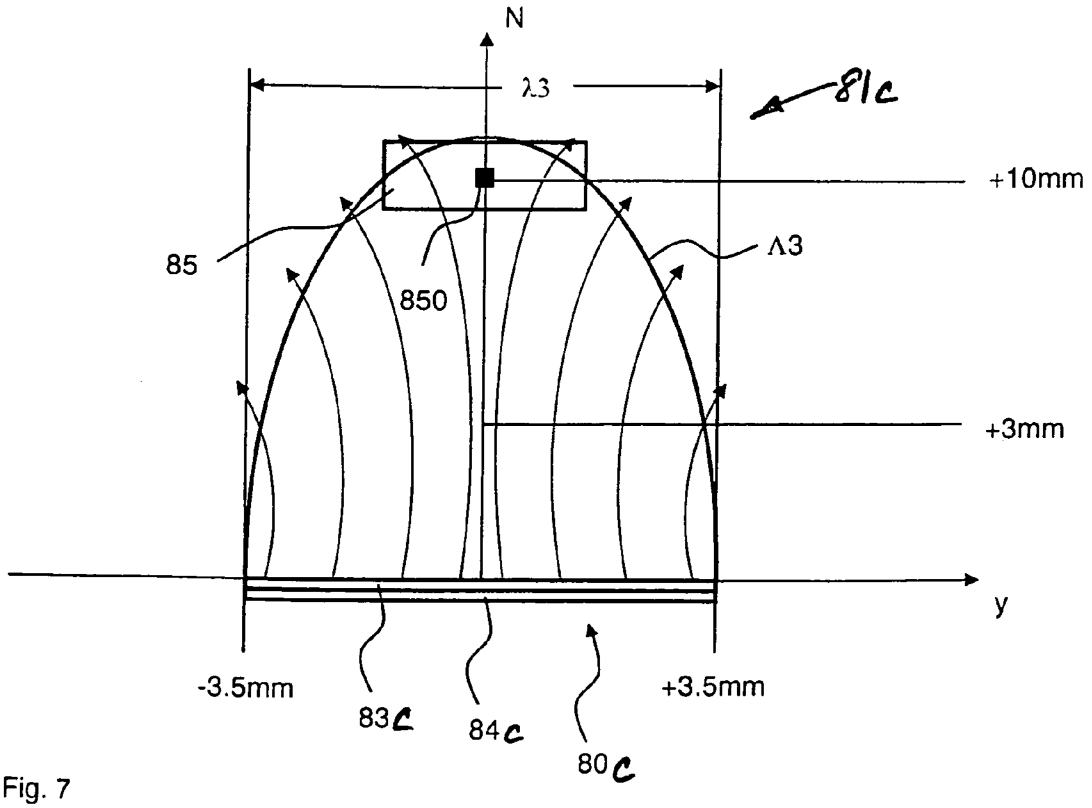
FIG. 7 is a longitudinal view of the sensor device above a code mark of the second embodiment equipment shown in FIG. 4.

With respect to the views in longitudinal direction: FIGS. 5 to 7 show views in the longitudinal direction y of the equipment 8*a*, 8*b*, 8*c* respectively for determination of the car position. While FIG. 5 shows the sensor device 81*a* and the code mark pattern 80*a* of the equipment 8*a* for determination of a car position of the prior art according to FIG. 2, FIGS. 6 and 7 show the first and second, respectively, embodiments according to the present invention of the arrangement of the sensor device 81*b*, 81*c* and the code mark pattern 80*b*, 80*c* of the equipment 8*b*, 8*c* for determination of the car position according to FIGS. 3 and 4.

With respect to the confidence region: The magnetic fields are illustrated by curved arrows with respect to the normal N. The signal strength of the code marks 83*a*, 83*b*, 83*c* is strongest in the center and decreases towards the edges of the code marks. In addition, the signal strength of the code marks 83*a*, 83*b*, 83*c* decreases from a certain spacing above the code marks. A region with sufficiently strong magnetic fields above the code marks 83*a*, 83*b*, 83*c*, in which the code marks can be scanned securely and reliably by the sensor device 81*a*, 81*b*, 81*c*, is termed confidence region. The confidence region is determined by the signal strengths of the code marks 83*a*, 83*b*, 83*c*, the sensitivity of the sensors 85, 85' as well as the mark dimensions MD1, MD2, MD3 of the code marks and the track dimension SD1, SD2, SD3 of the tracks of the sensors. For a given signal strength of the code marks 83*a*, 83*b*, 83*c* and given sensitivity of the sensors 85, 85' the confidence region is determined solely by the mark dimension MD1, MD2, MD3 and the track dimension SD1, SD2, SD3. The sensor areas 850, 850' of the sensors 85, 85' have to lie in the confidence region with a play of, for example +/−1 millimeter. The curve Λ1 limits the confidence region in the longitudinal direction y of the prior art equipment 8*a* for determination of the car position according to FIG. 2. The curve Λ2 limits the confidence region in the longitudinal direction y of the equipment 8*b* for determination of the car position of the first embodiment according to the present invention shown in FIG. 3. The curve Λ3 limits the confidence region in the longitudinal direction y of the equipment 8*c* for determination of the car position of the second embodiment according to the present invention shown in FIG. 4.

Due to the different mark dimension MD1=10/4 of the code marks 83*a* of the prior art embodiment according to FIG. 2 and MD2=10/6 of the first embodiment code marks 83*b* in accordance with FIG. 3, as well as MD3=10/7 of the second embodiment code marks 83*c* in accordance with FIG. 4, the height of the curve Λ1 is lower than the height of the curves Λ2, Λ3. In fact, the mark width δ=10 millimeters is identical in all illustrated forms of embodiment, but the shorter code marks 83*a* of the prior art according to FIG. 2 cause a lower effective signal strength and thus a lower confidence region. The losses of the signal strength of the code marks 83*a* with a short mark length λ2=4 millimeters according to FIG. 2 are so high that the sensors 85, 85' have to be arranged at a reduced spacing of merely three millimeters above the code marks 83*a*. The arrangement of the sensors 85, 85' according to FIG. 2 is thus limited by the signal strength, since the sensor areas 850, 850' have to lie in the confidence region with a play of +/−1 millimeter.

By contrast thereto, in the two embodiments according to the present invention in accordance with FIGS. 3 and 4 the mark length, λ2=6 millimeters or λ3=7 millimeters, is longer and avoids losses in the signal strength of the code marks 83*b*, 83*c*, which manifests itself as a larger confidence region. This large confidence region makes it possible to arrange the sensors 85 not at a spacing limited by the signal strength, but at a spacing, determined by the guidance effort, above the code marks 83*b*, 83*c*. Thus, the sensors 85, 85' are arranged at a large spacing of ten millimeters above the code marks 83*b*, 83*c*. A further extension of the mark length does not produce any further increase in the confidence region. This follows from the height of the curves Δ1, Δ2, Δ3 of the confidence regions in the transverse direction x according to FIGS. 8 to 10 described in the following, which result from the mark width δ=10 millimeters. With knowledge of the present invention the expert can thus guide the sensors by selective design of the confidence region at a minimum spacing in a range of 15 millimeters to 4 millimeters above the code marks.

Figure 8:
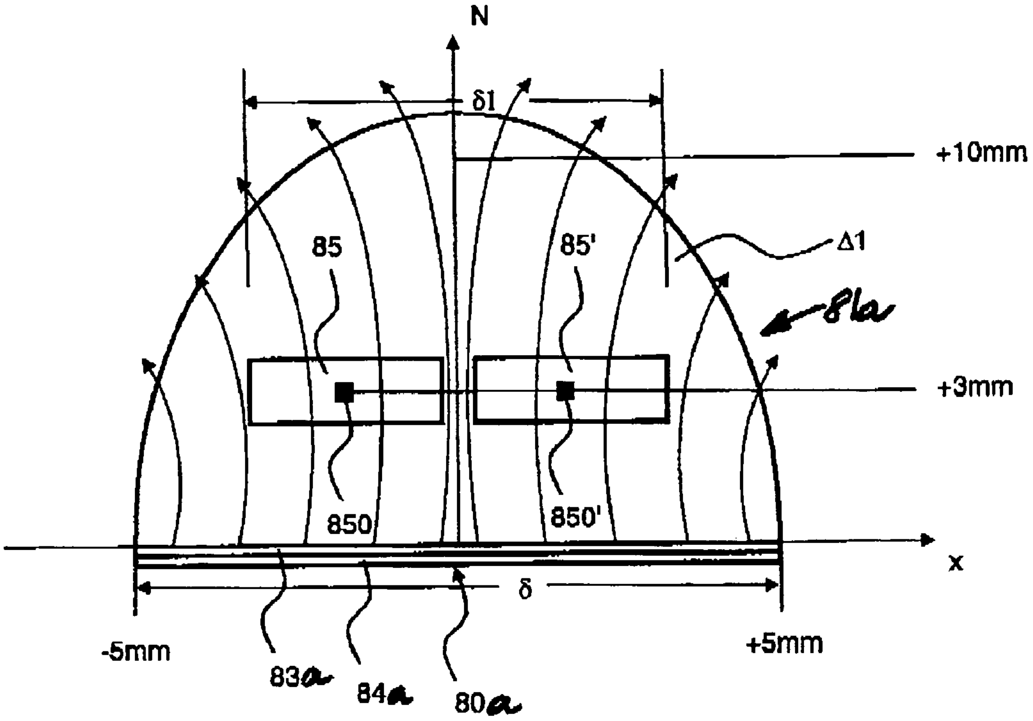
Fig. 8 (PRIOR ART)
FIG. 8 is a transverse view of the sensor device above a code mark of the prior art equipment shown in FIGS. 2 and 5.
Figure 9:
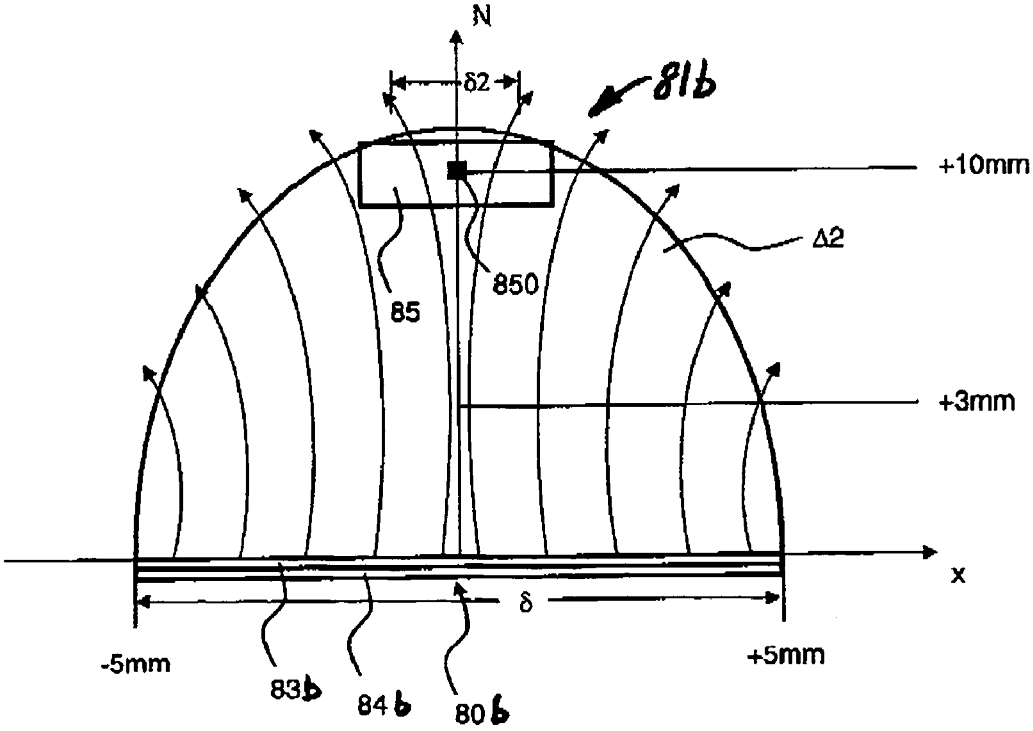
FIG. 9 is a transverse view of the sensor device above a code mark of the equipment shown in FIGS. 3 and 6.
Figure 10:
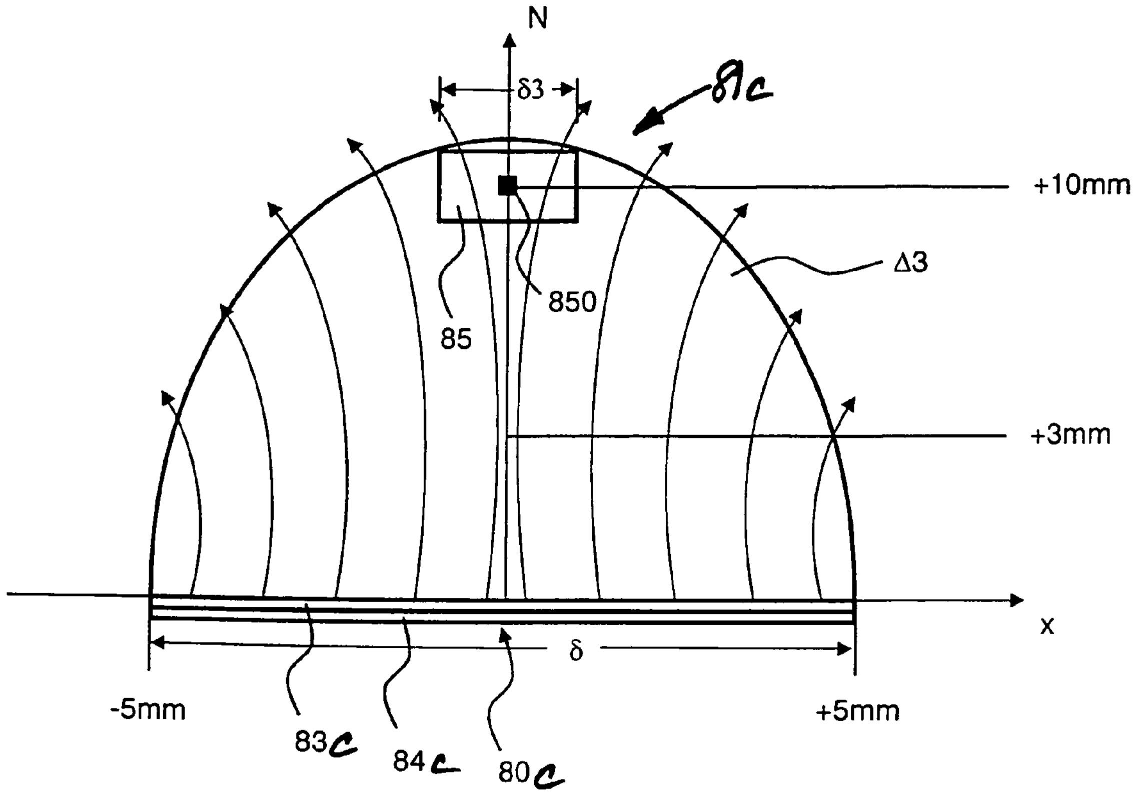
FIG. 10 is a transverse view of the sensor device above a code mark of the equipment shown in FIGS. 4 and 7.

With respect to the views in transverse direction: FIGS. 8 to 10 show views in the transverse direction x of the items of equipment 8*a*, 8*b*, 8*c* respectively for determining the car position. Whereas FIG. 8 shows the sensor device 81*a* and the code mark pattern 80*a* of the equipment 8*a* for determining the car position from the prior art according to FIGS. 2 and 5, FIGS. 9 and 10 show, respectively, the first and second embodiments according to the present invention of the arrangement of the sensor device 81*b*, 81*c* and the code mark pattern 80*b*, 80*c* of the equipment 8*b*, 8*c* for determining the car position in accordance with FIGS. 3 and 6 and FIGS. 4 and 7 respectively.

As already explained, a region with sufficiently powerful signal strength of the sensors 85, 85' above the code mark 83*a*, 83*b*, 83*c* is termed confidence region, in which confidence region the code marks can be securely and reliably scanned by the sensor device 81*a*, 81*b*, 81*c*. The curve Δ1 bounds the confidence region in the longitudinal direction x of the equipment 8*a* for determining the car position in the prior art according to FIG. 2. The curve Δ2 bounds the confidence region in the longitudinal direction x of the first embodiment according to the present invention of the equipment 8*b* for determining the car position in accordance with FIGS. 3 and 6. The curve Δ3 bounds the confidence region in the longitudinal direction x of the second embodiment according to the present invention of the equipment 8*c* for determining the car position in accordance with FIGS. 4 and 7.

Due to the identical mark width of ten millimeters, the heights of the curves Δ1, Δ2, Δ3 are of the same size. Not only the prior art embodiment of the sensor device 81*a* according to FIG. 2 with a track width δ1=7 millimeters, but also the first and second embodiments according to the present invention of the sensor device 81*b*, 81*c* in accordance with FIGS. 3 and 4 with track widths δ2=3 millimeters and δ3=2 millimeters, lie by their sensor areas in the confidence region of the curve Δ1, Δ2 and Δ3 respectively.

With knowledge of the present invention the expert can obviously realize other code mark patterns and appropriately constructed sensor devices. Thus, other physical principles are conceivable for representation of a length coding. For example, the code marks can have different dielectric constants read by a sensor device detecting capacitive effects. In addition, a reflective code mark pattern is possible in which according to the respective significance of the individual code marks a greater or lesser amount of reflected light is detected by a sensor device detecting reflected light.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation with at least one car and at least one equipment for detecting a car position, the equipment including a code mark pattern and a sensor device for scanning the code mark pattern, comprising:

the code mark pattern being mounted along a travel path of the at least one car and including a first plurality of code marks arranged in a single longitudinal track; and the sensor device being mounted at the car for contactlessly scanning the code marks with a second plurality of sensors arranged in a single longitudinal track, wherein said sensors are positioned at a maximum spacing from said code marks based upon a predetermined signal strength of said code marks, a predetermined sensitivity of said sensors and at least one of a mark dimension ratio of said code marks and a track dimension ratio of the track of said sensors.

2. The elevator installation according to claim 1 wherein said mark dimension is a width-to-length ratio of said code marks smaller than 2.5.

3. The elevator installation according to claim 1 wherein said track dimension is a ratio of a width of the track to a length of said sensors smaller than 2.5.

4. The elevator installation according to claim 1 wherein said sensors are guided at a minimum spacing in a range of six millimeters to four millimeters from said code marks.

5. A method of operating an elevator installation having at least one car and at least one equipment for detecting a position of the car, comprising the steps of:

a. providing a code mark pattern having a plurality of code marks arranged in a single track;

b. mounting the code mark pattern along the travel path of the at least one car;

c. proving a sensor device having a plurality of sensors arranged in a single track;

d. mounting the sensor device at the car, wherein for a predetermined signal strength of the code marks and a predetermined sensitivity of the sensors, selecting at least one of a mark dimension radio of the code marks and a track dimension radio of the track of the sensors so that the sensors are positioned at a maximum spacing from the code marks; and e. contactlessly scanning the code marks with the sensors.

6. An elevator installation with at least one car and at least one equipment for detecting a car position, the equipment including a code mark pattern and a sensor device for scanning the code mark pattern, comprising:

the code mark pattern being mounted along a travel path of the at least one car and including a first plurality of code marks arranged in a singe longitudinal track; and the sensor device being mounted at the car for contactlessly scanning the code marks with a second plurality of sensors arranged in a single longitudinal track, wherein said sensors are positioned at a maximum spacing from said code marks based upon a predetermined signal strength of said code marks, a predetermined sensitivity of said sensors and at least one of a mark dimension of said code marks and a track dimension of the track of said sensors, wherein said mark dimension is a width-to-length ratio of said code marks and said track dimension is a ratio of a width of the track to a length of said sensors.

7. The elevator installation according to claim 6 wherein said mark dimension is smaller than 2.5.

8. The elevator installation according to claim 6 wherein that said track dimension is smaller than 2.5.

9. The elevator installation according to claim 6 wherein said sensors are guided at a minimum spacing in a range of six millimeters to four millimeters from said code marks.

* * * * *